United States Patent

Ruther

Patent Number: 6,027,085
Date of Patent: Feb. 22, 2000

[54] CAMERA HOLDER FOR ATTACHMENT TO A TILT HEAD

[76] Inventor: Chris Ruther, Wellritzstr. 57, 65183 Wiesbaden, Germany

[21] Appl. No.: 08/985,971

[22] Filed: Dec. 4, 1997

[30] Foreign Application Priority Data

Jul. 28, 1997 [DE] Germany .............................. 297 13 427

[51] Int. Cl.⁷ .................................................... F16M 11/20
[52] U.S. Cl. ..................................... 248/187.1; 248/279.1; 296/419; 296/428
[58] Field of Search ............................ 248/187.1, 124.1, 248/124.2, 287.1, 278.1, 177.1, 178.1, 179.1, 279.1; 396/419, 428

[56] References Cited

U.S. PATENT DOCUMENTS

| | | | |
|---|---|---|---|
| 4,341,452 | 7/1982 | Korling | 354/293 |
| 4,457,610 | 7/1984 | Kawazoe | 354/293 |
| 4,613,105 | 9/1986 | Genequand et al. | 248/178.1 |
| 5,647,565 | 7/1997 | Wei | 248/177.1 |
| 5,791,609 | 8/1998 | Hankins | 248/124.1 |

FOREIGN PATENT DOCUMENTS

| | | | |
|---|---|---|---|
| 0 122 241 | 10/1984 | European Pat. Off. | G01D 11/30 |
| 80.183 | 6/1963 | France . | |
| 2.159.690 | 5/1973 | France | G03B 17/00 |
| 1167 545 | 4/1964 | Germany . | |
| 2.348.463 | 4/1974 | Germany . | |
| 7814287 | 8/1978 | Germany . | |
| 3406582 | 8/1985 | Germany | F16H 11/04 |
| 29713427 | 10/1997 | Germany . | |
| 1125736 | 8/1968 | United Kingdom | F16M 11/12 |

Primary Examiner—Ramon O. Ramirez
Attorney, Agent, or Firm—Nawrocki, Rooney & Sivertson, P.A.

[57] ABSTRACT

A camera holder for attachment to a tilt head, more particularly the tilt head of a camera support, comprising a bearer plate adapted to be attached to the tilt head, a mounting plate connected with the bearer plate, a receiving plate attached to the mounting plate in a sliding and pivoting manner and a holding plate for the camera. The camera holder furthermore has a slot which is provided in the mounting plate and a damping unit is anchored in such slot, such damping unit being connected at another end thereof with the receiving plate.

19 Claims, 3 Drawing Sheets

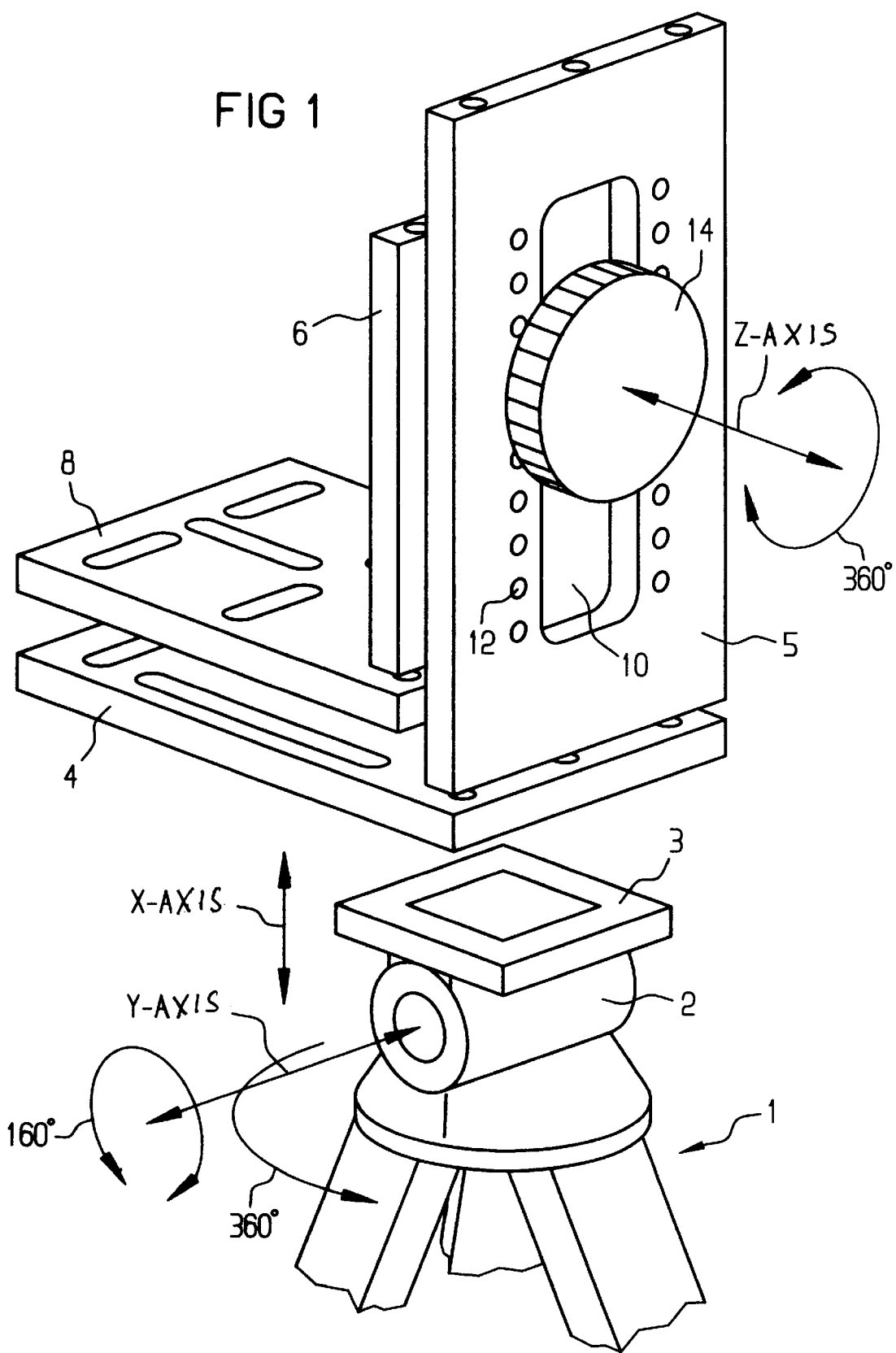

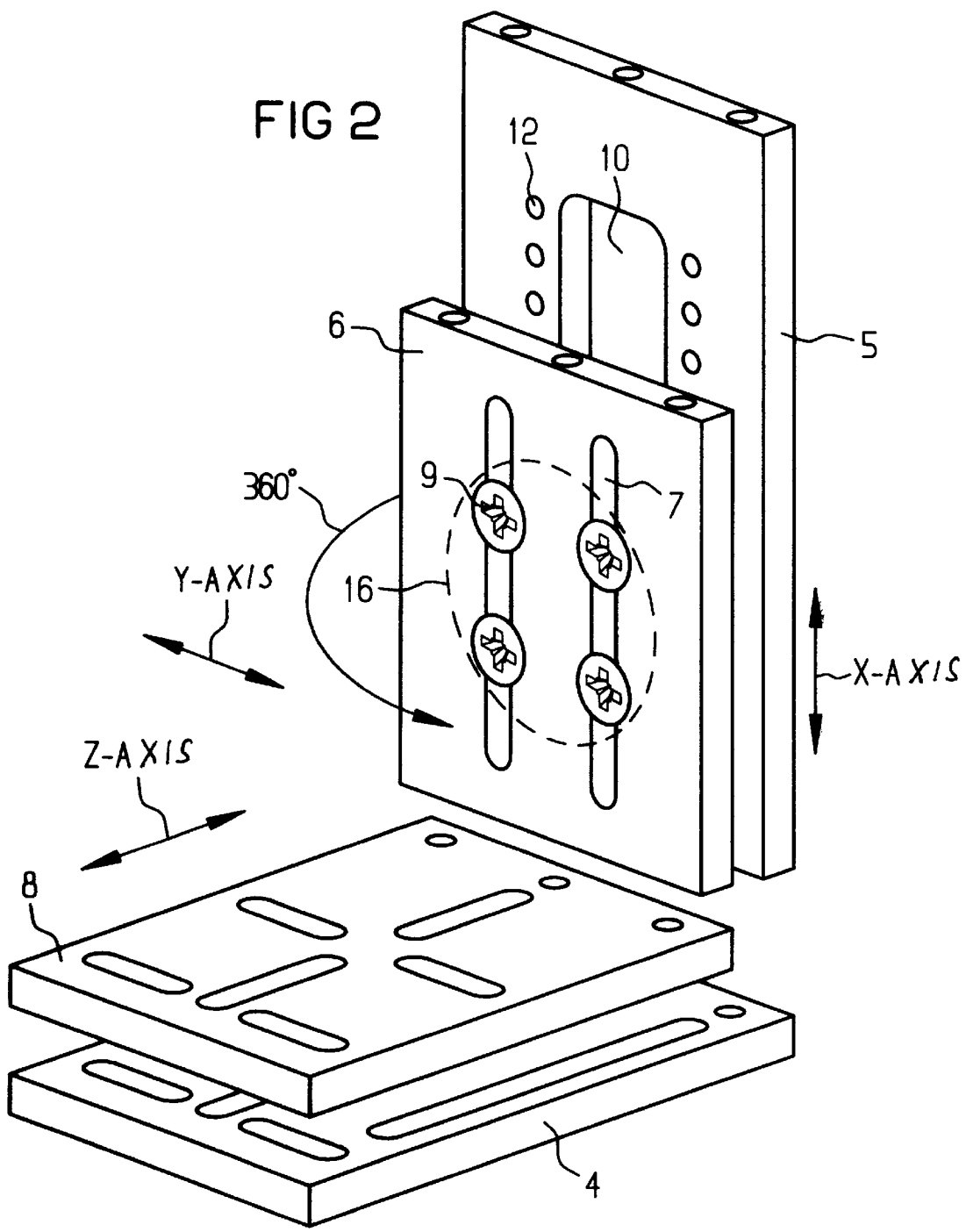

CAMERA HOLDER FOR ATTACHMENT TO A TILT HEAD

TECHNICAL FIELD

The invention relates to a camera holder for attachment to a tilt head, more particularly the tilt head of a camera support.

BACKGROUND OF THE INVENTION

Camera holders which are permanently joined to the tilt head of a camera support are for instance manufactured by the Ronford-Baker Company, England. The parts constituting the camera holder of such an arrangement have been so produced that they are unsuitable for various applications where adaptability of assembly is required. Furthermore, the known camera holder is only available fixed to a tilt head. The known camera holder is therefore not suitable for special applications

OBJECTS OF THE INVENTION

It is an object of the present invention is to provide a camera holder to be removably attached on a tilt head.

It is a further object of the invention to provide a camera support tilt head, which may be mounted in various different ways and renders it possible to utilize the camera in different positions.

SUMMERY OF THE INVENTION

In order to attain such objects the camera support in accordance with the invention for attachment on a tilt head and more particularly a camera support tilt head, is characterized by a bearer plate adapted to be attached to the tilt head, a mounting plate connected with the bearer plate, a receiving plate attached to the mounting plate in a sliding and pivoting manner and a holding plate, connected therewith, for the camera.

The camera holder of the invention may, together with its bearer plate, be attached to a tilt head in any desired manner. The mounting plate, receiving plate and holding plate may be attached in different positions on the bearer plate. Accordingly the camera holder is versatile and is suitable for holding the camera in many different positions. The different positions may be produced by a different attachment of the mounting plate, receiving plate and holding plate.

Preferably the support plate and the mounting plate are detachably connected together at ends thereof. This means that there is an angle element, which is to be preferred for reasons of assembly. Owing to the detachability different attachment positions of the mounting plate may be provided.

The bearer plate and the mounting plate are preferably set essentially at a right angle to one another. The angle of mounting is preferred in the case of rectangular coordinate systems.

The receiving plate and the holding plate are preferably connected together detachably at ends thereof. This means that the positioning of the receiving plate in relation to the holding plate may be varied. The attachment may be in the same direction as the attachment of the bearer plate and the mounting plate. However it may also be in the opposite direction.

The receiving plate and the mounting plate are preferably set essentially at a right angle to one another. This angle of setting is preferred in the case of rectangular coordinate systems.

The plates will preferably possess a rectangular form, the bearer plate and the holding plate being of different lengths, while possessing attachment means of equal size, as for example holes to receive mounting screws, for attachment on the mounting plate and, respectively, the holding plate. Accordingly the bearer plate and the holding plate may be swapped over, something increasing versatility in assembly and reducing the amount of accessories necessary.

A further preferred feature is that on both narrow sides thereof the mounting plate and the receiving plate possess attachment holes for attachment of the bearer plate and, respectively, the holding plate so that the versatility of the arrangement is still further increased.

The camera holder has preferably a slot provided in the mounting plate and a damping unit anchored in such slot, such damping unit being connected at another end thereof with the receiving plate. The damping unit (a transmission linkage) serves on the one hand for the attachment of the receiving plate on the mounting plate and on the other hand for tilting of the two plates in relation to each other and furthermore to select the desired damping effect for the tilt motion of the camera using the damping unit.

The camera holder has preferably a head which is arranged on the damping unit, such head fitting over the slot at its side facing away from the receiving plate and having detent pins secured thereto for fitting into holes, which are formed in the mounting plate. Using this arrangement it is readily possible to reset the receiving plate and the holding plate in relation to the mounting plate in the necessary position.

Detent pins are preferably attached to the head for fitting into the holes, said pins being formed on the mounting plate. Accordingly it is possible reliably arrest the head because the detent pins fit into the holes.

The holes are preferably formed along the longitudinal sides of the slot. This means that the adjustment knob may be made of such a size that it only slightly exceeds the width of the slot.

The camera holder has preferably a setting means on a free end of the head for resetting the damping effect.

The plates are preferably manufactured of aluminum, which means that there is a saving in weight.

BRIEF DESCRIPTION OF THE DRAWINGS

The invention may be more readily understood from the description of the embodiments which will now be described with reference to the accompanying drawings which are not restrictive of the invention, but rather illustrative. In the drawings FIG. 1 is a diagrammatic perspective view of the camera holder as seen from the rear;

FIG. 2 is a diagrammatic perspective plan view of the camera holder as seen fom the front.

DETAILED DESCRIPTION

Figure 3A:
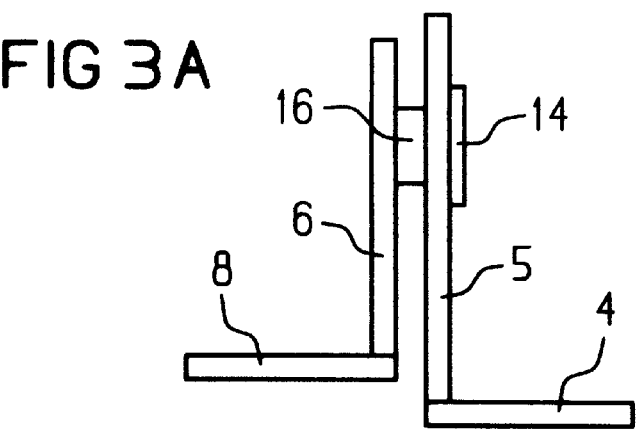
FIGS. 3A through 3C are diagrammatic representations of different possibilities of assembly of the camera holder in accordance with the invention.

FIG. 1 diagrammatically illustrates a camera support 1 having a tilt head 2. The camera holder is intended for attachment to a stand plate 3 of the tilt head 2. The camera holder comprises a rectangular bearer plate 4 of aluminum, which has attachment slots and attachment holes. The bearer plate 4 is intended for attachment on the stand plate 3. On the bearer plate 4 at a right angle thereto a mounting plate 5 is screwed in such a manner that the two plates are contiguous to each other at their ends. The mounting plate 5 is also rectangular and manufactured of aluminum. It comprises a slot 10 aong its longitudinal edges. Holes 12 are formed in the mounting plate 5 along the slot 10.

As better indicated in FIG. 2, the mounting plate 5 is connected with a rectangular receiving plate 6. The receiving plate 6 comprises mounting slots 7, on which a damping unit 16 (indicated in chained lines in FIG. 2) is to be attached by means of screws 9. The damping unit comprises a head 14 (FIG. 1), by means of which it is anchored to the mounting plate. The degree of damping of the damping unit 16 is able to be adjusted by the intermediary of a setting device, which is arranged on the head 14.

A holding plate 8 is screwed to the receiving plate 6 at the end and at a right angle, such holding plate serving for holding the camera and also being rectangular in design. It consists of aluminum and has slots and holes for attachment purposes.

In the case of the arrangement of FIGS. 1 and 2 the camera may be so mounted that its longitudinal axis, this being the axis through the objective, is along the Y axis or for so-called dutching along the Z axis (FIG. 2). During "dutching" the camera on the holding plate may be brought into the optic axis by displacement of the two angles in the most suitable manner in relation to one another.

Figure 3B:
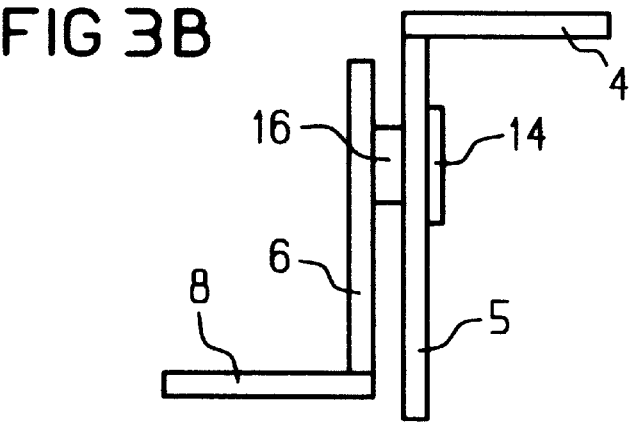
Figure 3C:
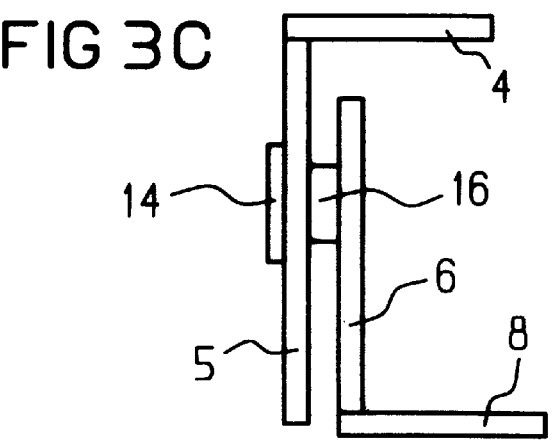

The positions indicated in FIGS. 1 and 2 of the camera holder are only examples. The receiving plate 6 may also be secured on the opposite side of the mounting plate 5 so that the holding plate 8 points away from the bearer plate 4 (see FIG. 3A). Furthermore it is possible for the bearer plate 4 to be attached on a tilt head in a dependent manner and the receiving plate 6 can be so attached on the mounting plate 5 that the holding plate 8 points away from the bearer plate 4 (FIG. 3B). Finally the bearer plate 4 may also be mounted on a tilt head in a dependent manner and the receiving plate 6 can be so attached to the mounting plate 5 that the holding plate 8 assumes a position underneath the bearer plate 4 (FIG. 3C). In the various different positions care is to be taken to see that the damping unit 16 is so mounted that its head is accessible. To ensure that the camera holder is able to be mounted in these different positions, the mounting plate 5 and the receiving 8 possess attachment holes on the two narrow sides for the attachment of the bearer plate 4 and, respectively, the holding plate 8. The different attachment positions of the bearer plate 4 in relation to the mounting plate, of the mounting plate in relation to the receiving and of the receiving plate in relation to holding plate ensure great adaptability and render the camera holder in accordance with the invention suitable for use in difficult conditions of operation involving special positions thereof.

On its lower side the head 14 comprises detent pins, which are intended for fitting into the holes 12. Accordingly it is possible for the head 14 to be set at different levels of the receiving plate 6 in relation to the mounting plate 5.

The camera holder of the invention renders it possible to cover a large range of applications in the creation of pictures. The camera holder in accordance with the invention may be mounted on any desired tilt heads.

Using the combination of the tilt head and the camera holder it is possible for all necessary tilt movements and more particularly a 360° pan shot about the X axis, a 160° pan shot about the Y axis and a 360° pan shot about the Z axis are possible as is indicated in FIG. 1.

The camera holder in accordance with the invention may be mounted on any fluidhead, when the stand plate of the respective tilt head is screwed in place. All cameras extending from video broadcasting cameras to 16 mm and 35 mm cameras may be mounted on the camera holder of the invention.

What is claimed is:

1. A camera holder for attachment to a tilt head of a camera support, comprising a bearer plate adapted to be attached to the tilt head, a mounting plate connected to the bearer plate, a receiving plate attached to the mounting plate in a sliding and pivoting manner and a holding plate for the camera, wherein a slot is formed in said mounting plate, and a damping unit is anchored at a first end thereof in said slot, said damping unit being connected at a second end thereof with said receiving plate.

2. The camera holder as claimed in claim 1, wherein the plates are manufactured of aluminum.

3. The camera holder as claimed in claim 1, wherein the bearer plate and the mounting plate are arranged essentially at a right angle to each other.

4. The camera holder as claimed in claim 1, wherein the receiving plate and the holding plate are detachably connected together at ends thereof.

5. The camera holder as claimed in claim 1, wherein the receiving plate and the holding plate are arranged essentially at a right angle to each other.

6. The camera holder as claimed in claim 1, wherein the plates have a rectangular configuration, the bearer plate and the holding plate being of different length while having attachment means of equal size for attachment to the mounting plate and, respectively, the holding plate.

7. The camera holder as claimed in claim 1, wherein on both narrow sides thereof the mounting plate and the receiving plate have attachment holes for attachment of the bearer plate and, respectively, the holding plate.

8. The camera holder as claimed in claim 1, wherein said damping unit comprises a head, said head movable along said slot at a side facing away from said receiving plate, said head having detent pins for receipt in holes formed in said mounting plate.

9. The camera holder as claimed in claim 8, wherein said holes are formed along longitudinal edges of said slot.

10. The camera holder as claimed in claim 8, characterized by setting means on a free end of the head for resetting the damping effect.

11. A camera holder for attachment to a tilt head, more particularly the tilt head of a camera support, comprising a bearer plate adapted to be attached to the tilt head, a mounting plate connected with the bearer plate, a receiving plate attached to the mounting plate in a sliding and pivoting manner and a holding plate for the camera, wherein a slot is provided in the mounting plate and a damping unit is anchored in such slot, such damping unit being connected at another end thereof with the receiving plate.

12. The camera holder as claimed in claim 11, wherein a head is arranged on the damping unit, such head fitting over the slot at its side facing away from the receiving plate and having detent pins secured thereto for fitting into holes, which are formed in the mounting plate.

13. The camera holder as claimed in claim 12, wherein holes are formed along longitudinal edges of the slot.

14. The camera holder as claimed in claim 12, characterized by a setting means on a free end of the head for resetting the damping effect.

15. A camera holder for attachment to a tilt head of a camera support, comprising:

a bearer plate adapted to be attached to the tilt head;

a holding plate adapted for attachment of a camera thereto; and a damping unit functionally disposed intermediate the bearer plate and the holding plate to effect damping between the bearer plate and the holding plate.

16. The camera holder as claimed in claim 15, wherein said bearer plate and a mounting plate are arranged essentially at a right angle to each other.

17. The camera holder as claimed in claim 16, wherein a receiving plate and said holding plate are detachably connected together at ends thereof.

18. The camera holder as claimed in claim 17, wherein said receiving plate and said holding plate are arranged essentially at a right angle to each other.

19. The camera holder as claimed in claim 18, wherein said plates have a rectangular configuration, the bearer plate and the holding plate being of different lengths and having attachment means of equal size for attachment, respectively, to said mounting plate and said holding plate.

* * * * *